(12) United States Patent
Kim et al.

(10) Patent No.: US 8,842,832 B2
(45) Date of Patent: Sep. 23, 2014

(54) METHOD AND APPARATUS FOR SUPPORTING SECURITY IN MULITICAST COMMUNICATION

(75) Inventors: Eunkyung Kim, Daejeon (KR); Sung Kyung Kim, Daejeon (KR); Sung Cheol Chang, Daejeon (KR); Hyun Lee, Daejeon (KR); Chul Sik Yoon, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 69 days.

(21) Appl. No.: 13/338,217

(22) Filed: Dec. 27, 2011

(65) Prior Publication Data

US 2012/0163600 A1    Jun. 28, 2012

(30) Foreign Application Priority Data

| Dec. 27, 2010 | (KR) | .................. | 10-2010-0135130 |
| Mar. 4, 2011 | (KR) | .................. | 10-2011-0019657 |
| Sep. 9, 2011 | (KR) | .................. | 10-2011-0092216 |
| Oct. 13, 2011 | (KR) | .................. | 10-2011-0104537 |
| Oct. 31, 2011 | (KR) | .................. | 10-2011-0112475 |
| Dec. 26, 2011 | (KR) | .................. | 10-2011-0141886 |

(51) Int. Cl.
*H04L 9/08* (2006.01)
*H04W 12/04* (2009.01)
*H04L 29/06* (2006.01)
*H04W 92/10* (2009.01)

(52) U.S. Cl.
CPC ............. *H04L 63/065* (2013.01); *H04W 12/04* (2013.01); *H04W 92/10* (2013.01)
USPC ........................................................ 380/270

(58) Field of Classification Search
USPC ........................................................ 380/270
See application file for complete search history.

(56) References Cited

U.S. PATENT DOCUMENTS

| 7,127,610 | B1* | 10/2006 | Li et al. .................. 713/163 |
| 7,461,253 | B2 | 12/2008 | Braskich et al. |
| 8,160,254 | B2* | 4/2012 | Cho et al. .................. 380/273 |
| 2009/0196424 | A1* | 8/2009 | Germaneau et al. ......... 380/277 |
| 2009/0280774 | A1 | 11/2009 | Patel et al. |
| 2009/0300358 | A1* | 12/2009 | Pang et al. .................. 713/171 |
| 2010/0061289 | A1* | 3/2010 | Mun et al. .................. 370/312 |
| 2010/0211786 | A1 | 8/2010 | Lim et al. |
| 2010/0315985 | A1* | 12/2010 | Moon et al. .................. 370/312 |

FOREIGN PATENT DOCUMENTS

KR    2009-0014770 A    2/2009

OTHER PUBLICATIONS

Eunkyung Kim et al., "Security Supporting Multicast in IEEE 802.16n", IEEE C802.16n-11/0048, Mar. 6, 2011.
Eunkyung Kim et al., "Security for Multicast in IEEE 802.16n", IEEE C802.16n-11/0070r1, May 18, 2011.
Eunkyung Kim et al., "Security for Multicast in IEEE 802.16n", IEEE C802.16n-11/0137, Jul. 2011.

(Continued)

*Primary Examiner* — Kambiz Zand
*Assistant Examiner* — Abiy Getachew
(74) *Attorney, Agent, or Firm* — Rabin & Berdo P.C.

(57) ABSTRACT

A method of supporting a security for a multicast communication is provided in a mobile station. The mobile station shares an MAK with a base station, derives a prekey based on a first parameter including the MAK, and derives a multicast security key including an MTEK based on a second parameter including the prekey, and decrypts a multicast traffic using the multicast security key.

15 Claims, 12 Drawing Sheets

(56) References Cited

OTHER PUBLICATIONS

Eunkyung Kim et al., "Security for Multicast in IEEE 802.16n", IEEE C802.16n-11/0137r1, Jul. 21, 2011.
Eunkyung Kim et al., "Multicast Key Usage and Update", IEEE C802.16n-11-0177, Sep. 12, 2011.
Eunkyung Kim et al., "Multicast Key Usage and Update", IEEE C802.16n-11/0177r1, Sep. 21, 2011.
Eunkyung Kim et al., "Multicast Key Usage and Update on IEEE 802.16.1a", IEEE C802.16n-11/0233, Oct. 31, 2011.
Eunkyung Kim et al., "Multicast Key Usage and Update on IEEE 802.16.1a", IEEE C802.16n-11/0233r1, Nov. 3, 2011.
Eunkyung Kim et al., "Multicast Key Usage and Update on IEEE 802.16.1a", IEEE C802.16n-11/0233r2, Nov. 9, 2011.
Eunkyung Kim et al., "Multicast Key Usage and Update on IEEE 802.16.1a", IEEE 0802.16n-11/0233r2, 1, Nov. 9, 2011.

* cited by examiner

METHOD AND APPARATUS FOR SUPPORTING SECURITY IN MULITICAST COMMUNICATION

CROSS-REFERENCE TO RELATED APPLICATION

This application claims priority to and the benefit of Korean Patent Application Nos. 10-2010-0135130, 10-2011-0019657, 10-2011-0092216, 10-2011-0104537, 10-2011-0112475 and 10-2011-0141886 filed in the Korean Intellectual Property Office on Dec. 27, 2010, Mar. 4, 2011, Sep. 9, 2011, Oct. 13, 2011, Oct. 31, 2011, Dec. 26, 2011, respectively, the entire contents of which are incorporated herein by reference.

BACKGROUND OF THE INVENTION (a) Field of the Invention

The present invention generally relates to a method and apparatus for supporting security in multicast communication.

(b) Description of the Related Art

A multicast communication is used to a group communication where users join in a conversation. In the group communication, the same downlink traffic is simultaneously transmitted to all the users of a group performing the group communication. Therefore, the users joining the group communication can use a multicast connection to transmit data of the group communication.

A conventional security support method merely supports a unicast communication, and does not support a multicast communication between a base station and a group of user. Accordingly, a security support method suitable for the multicast communication is required.

SUMMARY OF THE INVENTION

Embodiments of the present invention provide a security support method and apparatus capable of supporting a multicast communication.

According to one embodiment of the present invention, a method of supporting a security for a multicast communication is provided in a mobile station. The method includes sharing a multicast authorization key (MAK) with a base station, deriving a prekey based on a first parameter including the MAK, deriving a multicast security key including a multicast traffic encryption key (MTEK) based on a second parameter including the prekey, and decrypting a multicast traffic using the multicast security key.

The first parameter may further include an identifier of a multicast group to which the mobile station belongs.

The first parameter may further include an identifier of a multicast group zone to which the base station belongs. The multicast group zone may include a base station set including at least one base station.

The method may further include receiving a message including update information of the MTEK from the base station before a lifetime of the MTEK expires, determining whether an update of the MTEK is needed by comparing the update information with current information, and updating the MTEK based on the update information when the update information is different from the current information.

The mobile station may maintain a current MTEK when the information to update is the same as the current information.

The update information may include at least one of an encryption key sequence number or a counter value used to derive the MTEK.

The update information may further include a lifetime of the MTEK.

The method may further include receiving a message including update information of the multicast security key from the base station and updating the multicast security key based on the update information. The update information may include an identifier of a multicast group and a flow identifier within the multicast group where the multicast security key is updated, or a connection identifier of the multicast group where the multicast security key is updated.

According to another embodiment of the present invention, a method of supporting a security for a multicast communication is provided in a base station. The method includes sharing an MAK with a first mobile station, deriving a prekey based on a first parameter including the MAK, deriving a multicast security key including an MTEK based on a second parameter including the prekey, and encrypting a multicast traffic using the multicast security key.

The first parameter may further include an identifier of a multicast group to which the first mobile station belongs.

The first parameter may further include an identifier of a multicast group zone to which the base station belongs. The multicast group zone may include a base station set including at least one base station.

The method may further include transmitting a message including update information of the MTEK to the first mobile station before a lifetime of the MTEK expires. The update information may be compared with current information of the first mobile station to be used to determine whether an update of the MTEK is needed.

The update information may include at least one of an encryption key sequence number or a counter value used to derive the MTEK.

The update information may further include a lifetime of the MTEK.

The method may further include transmitting a message including update information of the multicast security key to the first mobile station. The update information may include an identifier of a multicast group and a flow identifier within the multicast group where the multicast security key is updated, or a connection identifier of the multicast group where the multicast security key is updated.

The method may further include joining a second mobile station in a multicast group to which the first mobile station belongs, transmitting a message including update information of the multicast security key to the second mobile station, and transmitting a message including the update information of the multicast security key to other mobile station of the multicast group.

The method may further include leaving the first mobile station from the multicast group, and transmitting a message including the update information of the multicast security key to other mobile station of the multicast group.

According to yet another embodiment of the present invention, an apparatus for supporting a security for a multicast communication is provided. The apparatus includes a security key generator configured to share an MAK with a base station, derive a prekey based on a first parameter including the MAK and derive a multicast security key including an MTEK based on a second parameter including the prekey, and an encryption/decryption unit configured to decrypt a multicast traffic using the multicast security key.

According to yet another embodiment of the present invention, an apparatus for supporting a security for a multicast communication is provided. The apparatus includes a security key generator configured to share an MAK with a mobile station, derive a prekey based on a first parameter including the MAK and derive a multicast security key including an MTEK based on a second parameter including the prekey, and an encryption/decryption unit configured to encrypt a multicast traffic using the multicast security key.

DETAILED DESCRIPTION OF THE EMBODIMENTS

In the following detailed description, only certain embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In the specification, the term "mobile station (MS)" may designate a terminal, a mobile terminal (MT), an advanced mobile station (AMS), a high reliability mobile station (HR-MS), a subscriber station (SS), a portable subscriber station (PSS), an access terminal (AT), a user equipment (UE), and so on, or may include all or some functions thereof.

Further, the term "base station" (BS) may designate an advanced base station (ABS), a high reliability base station (HR-BS), a node B, an evolved node B (eNodeB), an access point (AP), a radio access station (RAS), a base transceiver station (BTS), an MMR (mobile multihop relay)-BS, a relay station (RS) performing base station function, a high reliability relay station (HR-RS) performing the base station function and so on, or may include all or some functions thereof.

Figure 1:
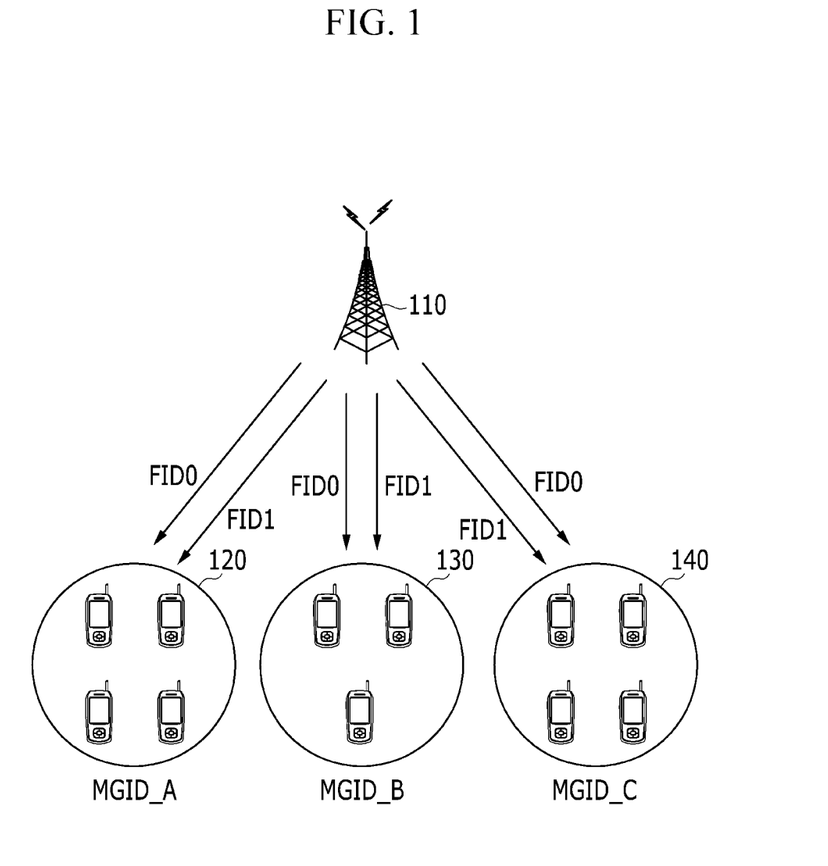
FIG. 1 to FIG. 3 show a multicast communication system according to embodiments of the present invention.

FIG. 1 shows a multicast communication system according to an embodiment of the present invention.

Referring to FIG. 1, a base station 110 uses a multicast group identifier (ID) allocated to a multicast group 120, to provide the multicast group 120 including mobile stations with a multicast communication. The multicast group ID is uniquely allocated within the base station 110 and has a finite size. The multicast group ID is used as an ID for notifying the multicast group of the allocated resource. Other multicast groups 120, 130, and 140 have different multicast group ID MGID_A, MGID_B, and MGID_C.

The base station 110 uses a flow identifier (FID) for identifying a connection besides the multicast group ID. The base station 110 allocates the FID in each multicast group ID, thereby uniquely identifying the connection, i.e., a service flow within the multicast group. Since the FID is an ID for identifying a signal or traffic connection within the multicast group, a particular connection of the multicast group can be identified a combination of the multicast group ID and FID in the base station 110. That is, the base station 110 uses the multicast group ID and the FID to provide the multicast group 120 with a multicast service. The same FID (FID0 or FID 1) can be used in the other multicast groups 120, 130, and 140.

Figure 2:
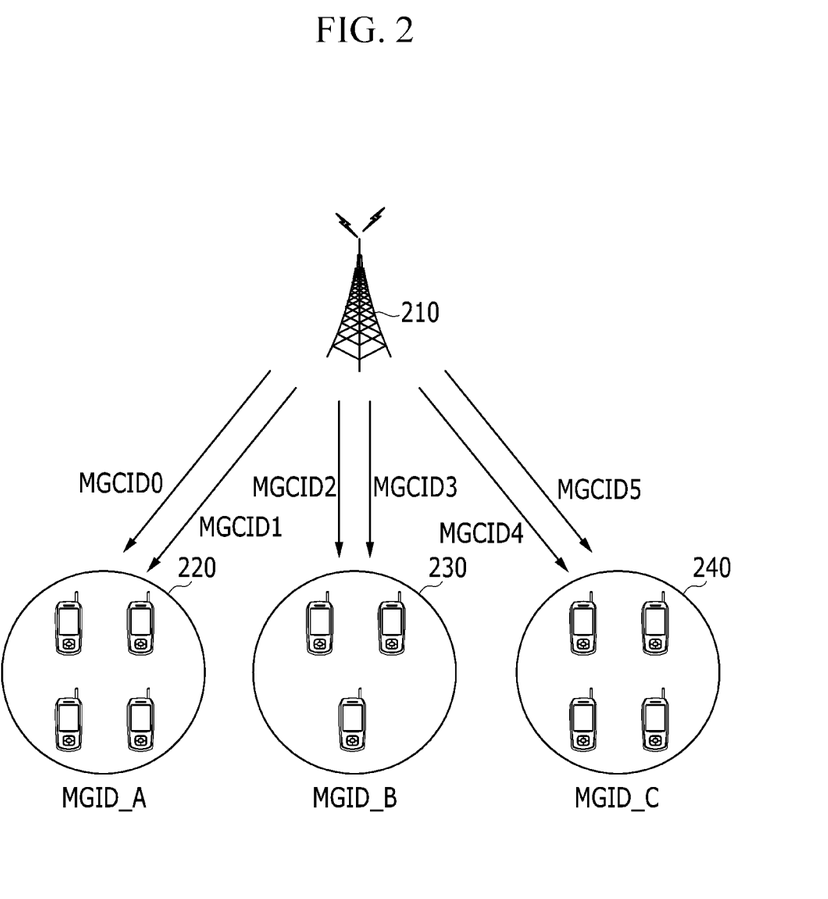

FIG. 2 shows a multicast communication system another embodiment of the present invention.

Referring to FIG. 2, a base station 210 uses a multicast group connection ID (CID) allocated to a multicast service, to provide a multicast group 120 including a plurality of mobile stations with the multicast service. The multicast group CID is uniquely allocated for identifying a connection (a service flow) within the base station 210 and has a finite size. Other multicast group CIDs (MGCID0, MGCID1, MGCID2, MGCID3, MGCID4, and MGCID5) are used in different multicast groups 220, 230, and 240. A multicast resource allocated to the multicast service can be notified to the multicast group through the multicast group CID.

Figure 3:
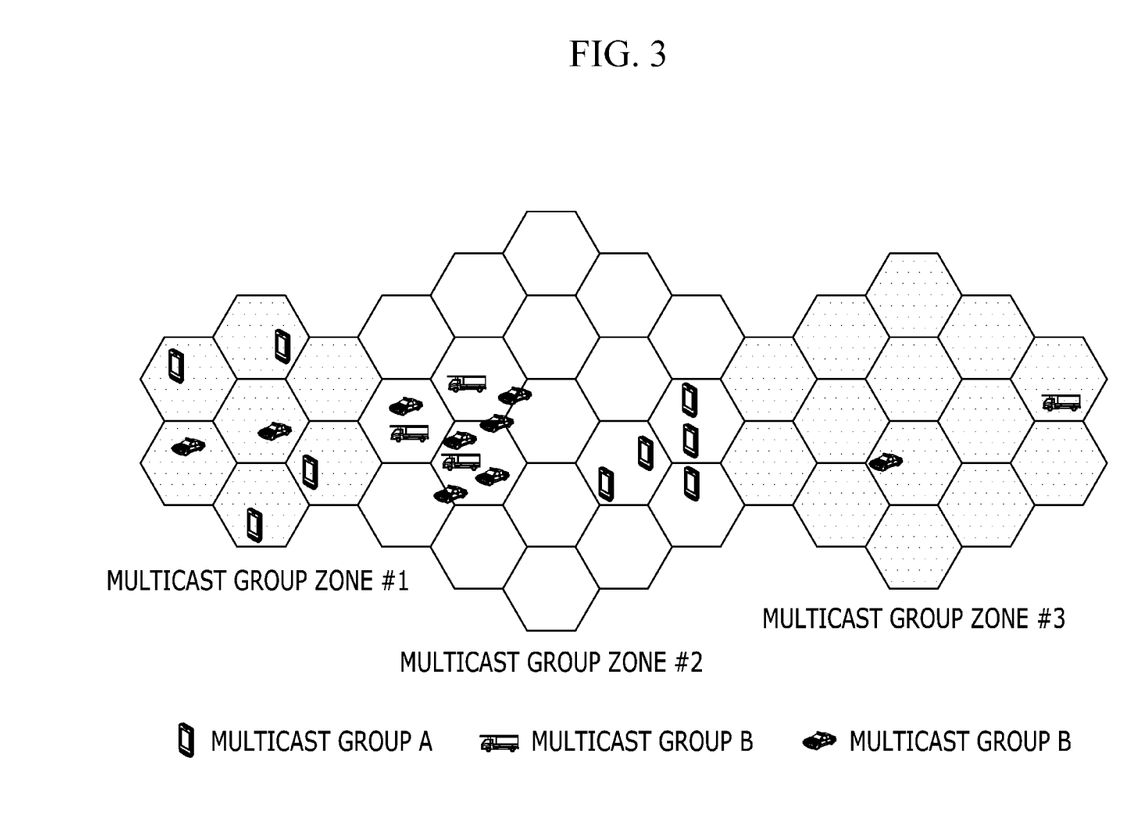

Referring to FIG. 3, a multicast group zone is defined as a set of base stations including at least one base station in a group communication system according to an embodiment of the present invention. A unique multicast group zone ID is allocated to the multicast group zone. In the multicast group zone, base stations use the same multicast group ID and FID (see an embodiment of FIG. 1) or the same multicast group CID (see an embodiment of FIG. 2) for transmitting data of a certain service flow. Accordingly, if a mobile station has already registered with a base station for a multicast service, the mobile station can be seamlessly receive the multicast service without reregistering with other base station even if the mobile station moves to the other base station within the same multicast group zone. If the mobile station moves from a base station to another base station where those base stations provide the same multicast service but they belong to different multicast group zone, the mobile station can seamlessly receive the multicast service by updating a service flow parameter.

If only one base station belong to a multicast group zone, the single base station uses a multicast group CID for providing a multicast service, independently from other base stations.

Hereinafter, a security support method for a multicast service will be described with reference to FIG. 4 to FIG. 10.

Figure 4:
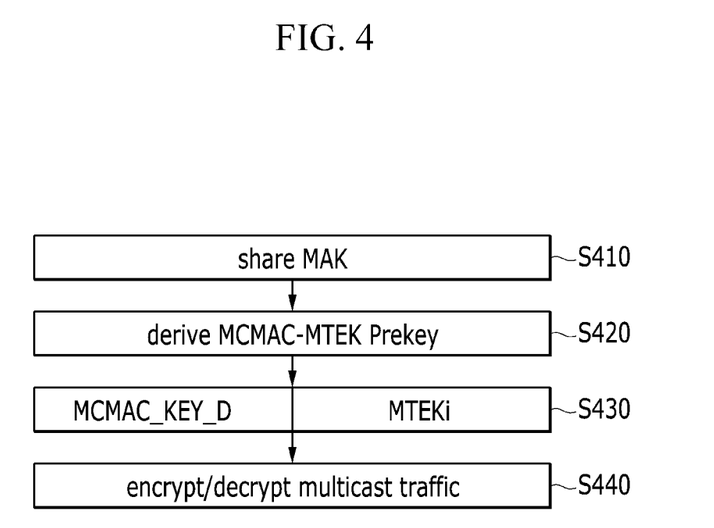
FIG. 4 shows a security support method according to an embodiment of the present invention.

FIG. 4 shows a security support method according to an embodiment of the present invention.

Referring to FIG. 4, a base station and mobile stations belonging to a multicast group manage a multicast specific key including a multicast CMAC (MCMAC) key and a multicast TEK (MTEK), for a secure multicast communication, where CMAC indicates a cipher-based message authentication code, and TEK indicates traffic encryption key.

First, the base station and each mobile station share a multicast authorization key (MAK) (S410). The MAK is a unique key and can be shared by the mobile stations in a multicast group. Further, the MAK may be unique within a multicast group zone as well as the multicast group. When the multicast group zone is changed or the mobile station moves from one multicast group zone to another multicast group zone, the mobile station may update the MAK.

The base station and each mobile station derive a prekey for the MCMAC key and the MTEK, i.e., an MCMAC-MTEK prekey from the MAK (S420). For example, the MCMAC-MTEK may be derived using the MAK, an MAK_COUNT and a length of the MCMAC-MTEK prekey (160 bits) as Equation 1, where MAK_COUNT is a counter that is used to ensure different MCMAC keys and TEKs are used for a handover, a network reentry, a location update, a zone switch during the multicast service. Differently from Equation 1, when deriving the MCMAC-MTEK prekey a multicast group ID (MGID) may be further used as Equation 2. As shown in Equations 3 and 4, when deriving the MCMAC-MTEK prekey, a multicast group zone ID (MGZoneID) as well as the MGID may be further used. In Equations 3 and 4, a parameter having each bit set to a particular value may be used instead of the multicast group zone ID (MGZoneID).

$$\text{MCMAC-MTEK prekey} = \text{Dot16KDF}(\text{MAK}, \text{MAK\_COUNT}|\text{``MCMAC-MTEK prekey''}, 160) \quad (1)$$

$$\text{MCMAC-MTEK prekey} = \text{Dot16KDF}(\text{MAK}, \text{MAK\_COUNT}|\text{MGID}|\text{``MCMAC-MTEK prekey''}, 160) \quad (2)$$

$$\text{MCMAC-MTEK prekey} = \text{Dot16KDF}(\text{MAK}, \text{MAK\_COUNT}|\text{MGID}|\text{MGZoneID}|\text{``MCMAC-MTEK prekey''}, 160) \quad (3)$$

$$\text{MCMAC-MTEK prekey} = \text{Dot16KDF}(\text{MAK}, \text{MAK\_COUNT}|\text{MGID'MGZoneID}|\text{``MCMAC-MTEK prekey''}, 160) \quad (4)$$

In Equations 1 to 4 and a below equations, Dot16KDF is a function having a key, an astring and a key length as inputs, and may be for example a Dot16KDF function defined in IEEE Std 802.16-2009.

Next, the base station and each mobile station derive an MCMAC key and MTEKs from the MCMAC-MTEK prekey (S430). The MCMAC key and the MTEK may be generated whenever new MAK is derived or new MAK_COUNT is used. Only a downlink MCMAC key (MCMAC_KEY_D) may be generated according to characteristic of the multicast communication. For example, the MCMAC key may be derived using the MCMAC-MTEK prekey and a length (128 bits) of the MCMAC-MTEK prekey as Equation 5, and each MTEK (MTEKi) may be derived using the MCMAC-MTEK prekey, a multicast security association ID (MSAID) and a length (128 bits) of the MTEK. A security association (SA) is a set of information required for secure communication between the base station and the mobile station. The multicast security association (MSA) is an SA for a multicast transport/control flow, and is shared by the base station and the mobile station. MSAID is an ID for identifying the MSA.

$$\text{MCMAC\_KEY\_D} = \text{Dot16KDF}(\text{MCMAC-MTEK prekey}, \text{``MCMAC\_KEYS''}, 128) \quad (5)$$

$$\text{MTEKi} = \text{Dot16KDF}(\text{MCMAC-MTEK prekey}, \text{MSAID}|\text{COUNTER\_MTEK} = i|\text{``MTEK''}, 128) \quad (6)$$

The base station and each mobile station encrypt or decrypt multicast traffics using the generated MCMAC key and/or MTEK (S440).

While it has been described FIG. 4 that only the downlink MCMAC key (MCMAC_KEY_D) is generated, an uplink MCMAC key may be generated when an uplink multicast traffic exists in the multicast communication.

Next, a multicast security context that is a set of parameters associated with a multicast security key will be described with reference to Table 1 to Table 3.

An MAK context includes parameters associated with the MAK, and is generated whenever a new MAK is derived. For example, the MAK context may include parameters described in Table 1.

TABLE 1

| Parameter | Size (bit) | Usage |
|---|---|---|
| MAK | 160 | Shared by mobile stations in a multicast group. |

TABLE 1-continued

| Parameter | Size (bit) | Usage |
|---|---|---|
| MAK lifetime | 32 | MAK lifetime |
| MAKID | 64 | Identifies the MAK. |
| MAK_COUNT | 16 | A value used to derive the MCMAK key and MTEK |
| MCMAC_KEY_D | 128 | A key which is used for signing downlink (DL) medium access control (MAC) control messages |
| MCMAC_PN_D | 24 | Used to avoid DL replay attack on the control connection before this expires, reauthorization is needed. An initial value of MCMAC_PN_D is zero and a value of MCMAC_PN_D is reset to zero whenever MAK_COUNT is increased. |
| Next available counter_MTEK | 16 | A counter value to be used in next MTEK derivation, after derivation this is increased by 1. |

An MSA context is a set of parameters managed by each MSA, and includes an MTEK context and additional information that belongs to the MSA itself. For example, the MSA context includes parameters described in Table 2.

TABLE 2

| Parameter | Size (bit) | Usage |
|---|---|---|
| MSAID | 8 | An identifier of this MSA, which describes the applied en/decryption method and MTEK contexts. |
| MTEK context | | MTEK context used for a downlink. |

The MTEK context includes relevant parameters of a single MTEK, and includes for example parameters described in Table 3.

TABLE 3

| Parameter | Size (bit) | Usage |
|---|---|---|
| MTEK | 128 | Key used for encryption or decryption of MAC packet data units (PDUs) from FIDs associated with the corresponding MSA |
| MEKS | 2 | Encryption key sequence number |
| COUNTER_MTEK | 16 | A counter value used to derive this MTEK |
| MTEK lifetime | 32 | MTEK lifetime |
| MTEK_PN_D | 22 | A packet number (PN) used for encrypting DL packets. After each MAC PDU transmission, a value is increased by 1. |
| PN Window Size | | A receiver tracks the PNs received inside PN window |

As described above, according to an embodiment of the present invention, using the multicast security shared by the mobile station and the base station can support the security in the multicast communication.

Next, an update procedure of the multicast security key will be described with reference to FIG. 5 to FIG. 10.

FIG. 5 to FIG. 10 show procedures updating multicast security key according to embodiments of the present invention.

Figure 5:
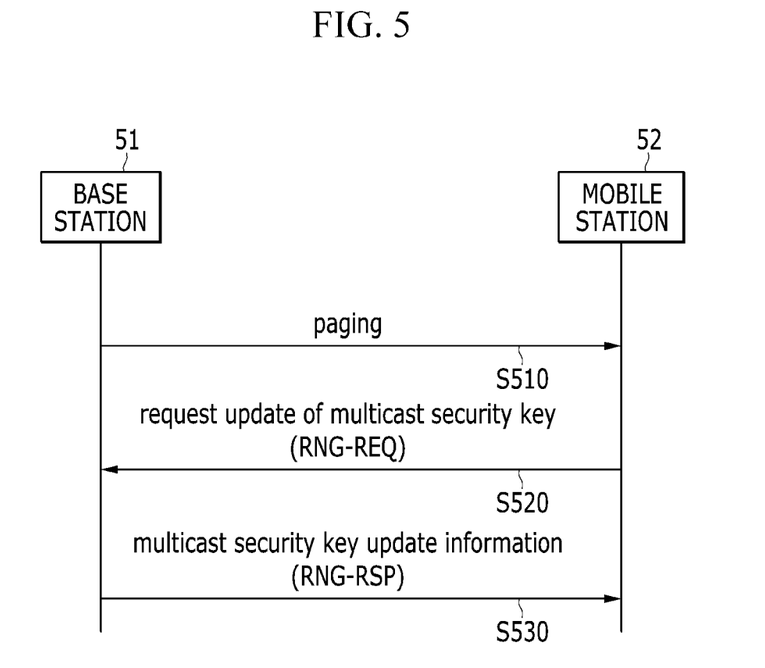
FIG. 5 to FIG. 10 show procedures updating multicast security key according to embodiments of the present invention.

Referring to FIG. 5, in one embodiment, a base station 51 pages for indicating a security key update to mobile stations within a multicast group, for updating the multicast security key (S510). The mobile station 52 transmits a ranging request (RNG-REQ) message to the base station 51 in response to the paging (S520). The base station 51 transmits a ranging response (RNG-RSP) message including multicast security key update information to the mobile station 52 in response to the RNG-REQ message (S530). Further, the paged mobile station 52 may perform a location update using the RNG-REQ and RNG-RSP messages in an idle mode.

Figure 6:
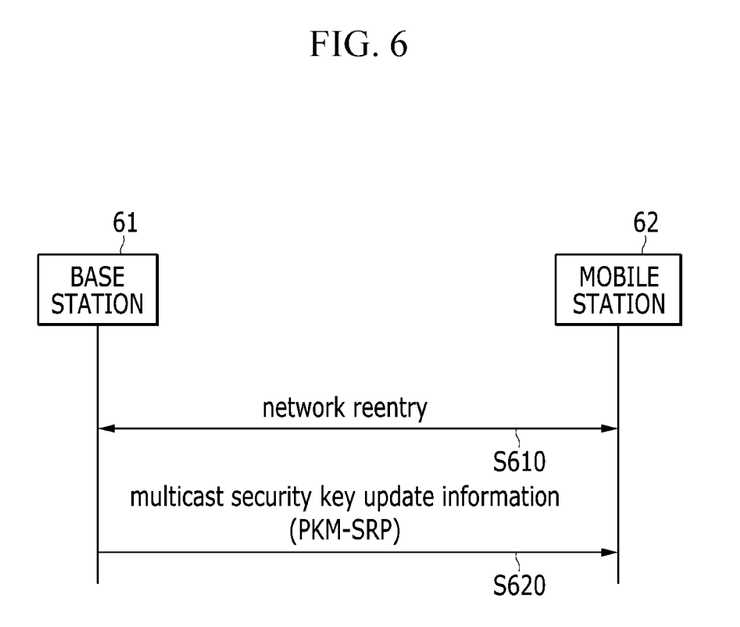

Referring to FIG. 6, in another embodiment, after a mobile station 62 reenters a network (S610), a base station 61 transmits a key update message including multicast security key update information to the mobile station 62 (S620). Accordingly, the mobile station 52 can update the multicast security key. For example, the key update message may be a privacy key management response (PKM-RSP) message. The key update message may be transmitted in unicast to the mobile station 62 in which an update of the multicast security key is needed. Alternatively, when the update of the multicast security key is needed in other mobile stations of the multicast group, the key update message may be transmitted in multicast to the mobile stations of the multicast group.

Figure 7:
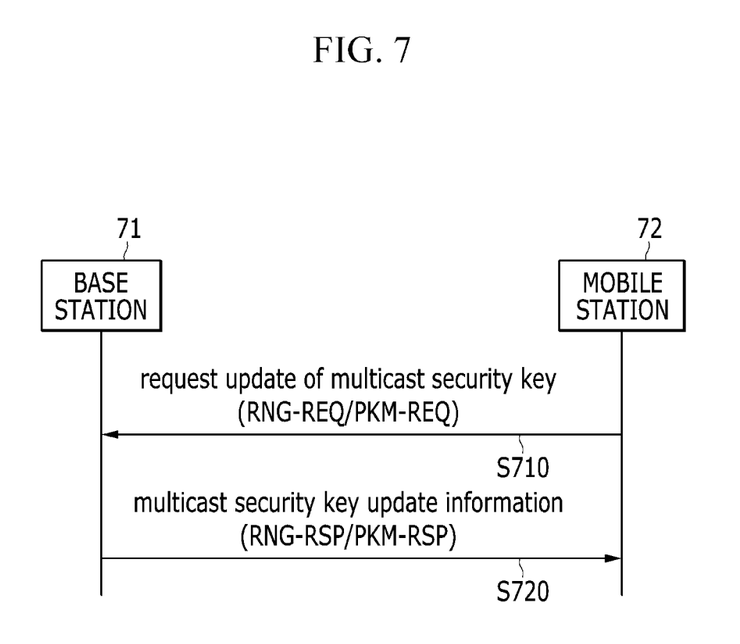

Referring to FIG. 7, if a mobile station 72 does not have security key information on the multicast suitable for an encrypted message received from a base station 71, the mobile station 72 cannot decrypt the encrypted message. In this case, the mobile station 72 transmits a request message for requesting an update of the multicast security key to the base station 71 (S710). The base station 71 transmits a response message including update information of multicast security key to the mobile station 72 in response to the request message (S720). When the mobile station 72 performs a location update or a network reentry, the request message may be an RNG-REQ message or a PKM request (PKM-REQ) message, and the response message may be an RNG-RSP message or a PKM-RSP message.

In some embodiments, besides the location update or the network, when a multicast group zone is changed or a mobile station moves across the multicast group zone, the multicast security key may be updated as described in FIG. 5 to FIG. 7. In this case, a target base station of the moved cell may transmit the notification of the multicast security key update and update information. The update information may be transmitted through the RNG-RSP or PKM-RSP message. Against a change of the multicast group zone, the mobile station may perform the update of the multicast security key through a previous base station in advance before moving across the multicast group zone.

In some embodiments, a multicast security key may be updated within the same base station or the same multicast group zone. For example, when a lifetime of the multicast security key expires or a configuration of the multicast group changes, the multicast security key may be updated. The configuration of the multicast group may change according to a join, leave or change of a mobile station in the multicast group, or an addition, delete or change of a service flow. In this case, a base station and the mobile station may perform the join, leave or change as a part of DSx procedure. The DSx procedure is a join procedure by an exchange of a dynamic service addition request (DSA-REQ) message and DSA response (DSA-RSP) message, a leave procedure by an exchange of a dynamic service deletion request (DSD-REQ) message and a DSD response (DSD-RSP) message, or a change procedure by an exchange of a dynamic service change request (DSC-REQ) message and a DSC response (DSC-RSP) message.

Figure 8:
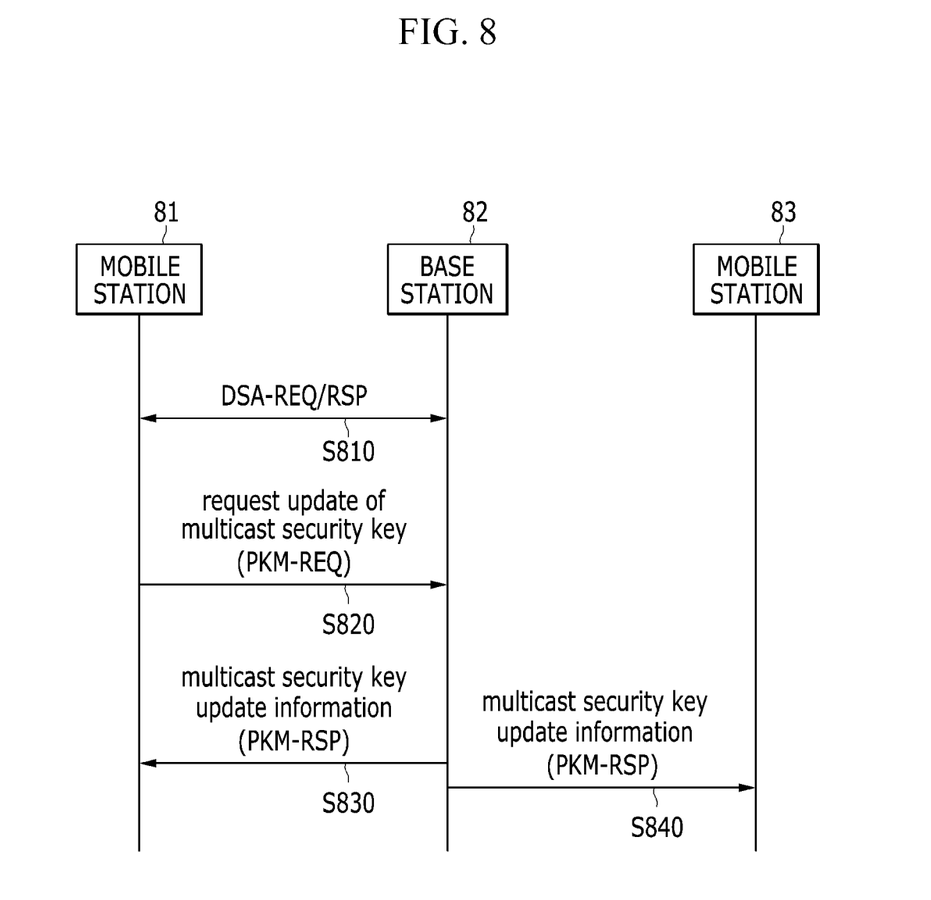

Referring to FIG. 8, when a mobile station 81 joins in a multicast group, the mobile station 81 and a base station 82 exchange DSA-REQ and DSA-RSP messages (S810). The DSA-REQ and DSA-RSP messages may include a multicast group ID and FID, or a multicast group CID.

Subsequently, the mobile station 81 transmits a multicast security key request message to the base station 82 (S820), and the base station 82 a multicast security key response message including multicast security key update information to the mobile station 81 (S830). The multicast security key request message and the multicast security key response message may be a PKM-REQ message and a PKM-RSP message, respectively.

The base station 82 transmits a message including the multicast security key update information to other mobile stations 83 of the multicast group (S840). Accordingly, the base station 82 can notify the update of the multicast security key and update information to the other mobile stations 83 of the multicast group. The message transmitted to the other mobile stations 83 may be the PKM-RSP message.

Figure 9:
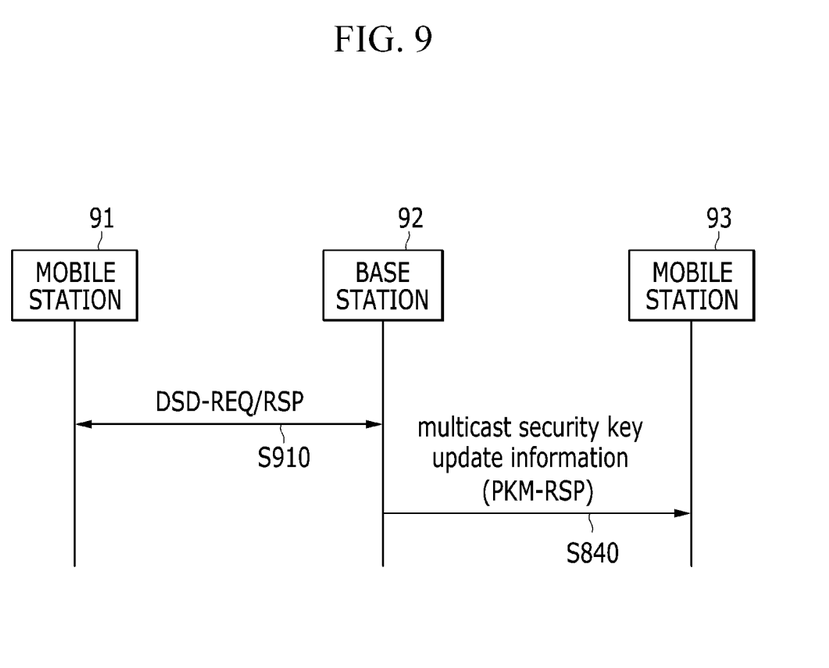

Referring to FIG. 9, when a mobile station 91 leaves a multicast group, the mobile station 91 and a base station 92 exchange DSD-REQ and DSD-RSP messages (S910). The DSD-REQ and DSD-RSP messages may include a multicast group ID and FID, or a multicast group CID.

The base station 92 transmits a message including multicast security key update information to other mobile stations 93 of the multicast group (S920). The message transmitted to the other mobile stations 93 may be a PKM-RSP message. That is, the base station 92 transmits the PKM-RSP message to only the other mobile stations 93 to prevent the mobile station 91 that has left the multicast group from decrypting multicast data.

In FIG. 5 to FIG. 9, the multicast security key update information may include a COUNTER_MTEK. The mobile station updates an MTEK based on the COUNTER_MTEK. The multicast security key update information may further include an MEKS, and the mobile station can determine based on the MEKS whether MTEK needs to update. The multicast security key update information may further include an MTEK lifetime. The multicast security key update information may further include a multicast group ID and FID where the MTEK is updated or a multicast group CID where the MTEK is updated. Alternatively, the multicast security key update information may include an MAK or information necessary for updating the MAK.

As described above, according to an embodiment of the present invention, when a multicast security key needs to update in a multicast communication, the mobile station and the base station can share the updated multicast security key.

Further, the mobile station and the base station can update the multicast security key when a lifetime of the multicast security key, for example the MTEK lifetime expires. Alternatively, the multicast security key may be updated before the lifetime of the multicast security key expires. This embodiment will be described with reference to FIG. 10.

Figure 10:
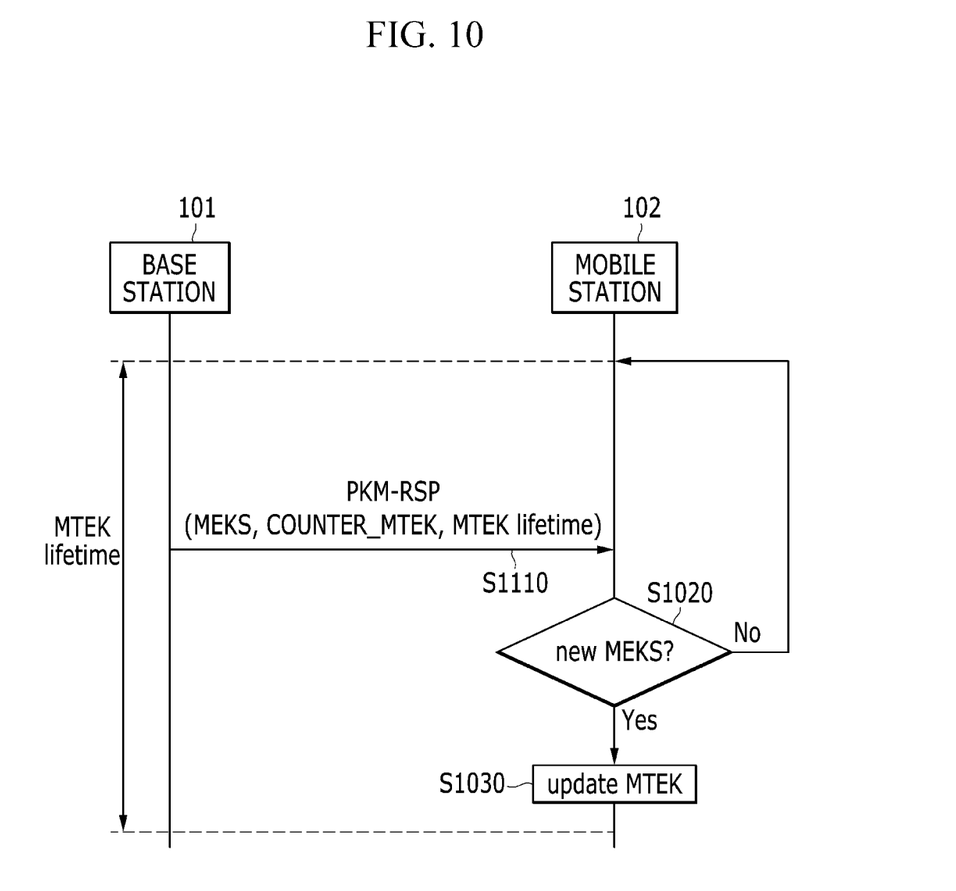

Referring to FIG. 10, before a lifetime of a multicast security key, for example an MTEK lifetime expires, a base station 101 transmits a PKM-RSP message including update information of an MTEK to a mobile station 102 to request an update of the MTEK (S1010). The MTEK update information may include an MEKS, a COUNTER_MTEK, and an MTEK lifetime. The PKM-RSP message may have a type indicating the MTEK update. The MTEK update information may further include an FID and multicast group ID where the MTEK is updated, or a multicast group CID where the MTEK is updated.

The mobile station 102 determines whether the MEKS of the PKM-RSP message is a new MEKS, by comparing a current MEKS with the MEKS of the PKM-RSP message (S1020). When the MEKS is the new MEKS, the mobile station 102 updates the multicast security key, i.e., the MTEK based on the multicast security key update information, for example the COUNTER_MTEK (S1030). When the MEKS is not the new MEKS, the mobile station maintains the current multicast security key without updating the multicast security key. Alternatively, the mobile station 102 may determine whether it needs to update the multicast security key, by comparing a current COUNTER_MTEK with the COUNTER_MTEK of the PKM-RSP message.

As described above, according to an embodiment of the present invention, the multicast security key can be updated before the lifetime expires. Further, even if the base station requests the update, the mobile station cannot update the multicast security key when the update is not needed.

Next, an apparatus supporting security for performing a method supporting security according to an embodiment of the present invention will be described with reference to FIG. 11 and FIG. 12.

Figure 11:
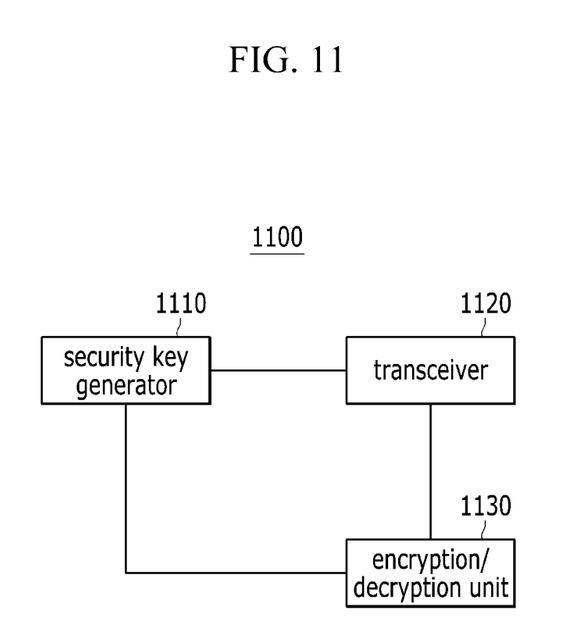
FIG. 11 and FIG. 12 each are a block diagram of apparatus supporting security according to an embodiment of the present invention.
Figure 12:
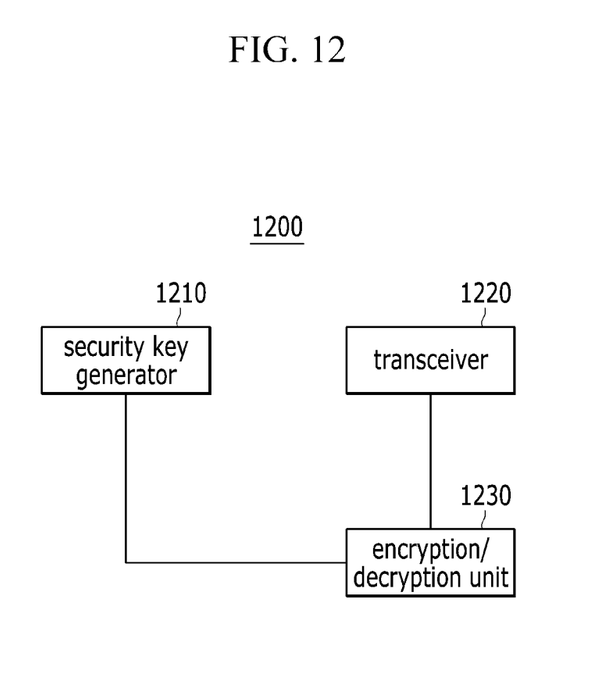

FIG. 11 and FIG. 12 each are a block diagram of an apparatus supporting security according to an embodiment of the present invention.

Referring to FIG. 11, an apparatus supporting security 1100 includes a security key generator 1110, a transceiver 1120, and an encryption/decryption unit 1130. The apparatus supporting security of FIG. 11 may be included in a mobile station, or may be the mobile station itself.

The security key generator 1110 generates or updates a multicast security key to share the multicast security key with a base station, as described with reference to FIG. 4 to FIG. 10. The transceiver 1120 transmits a multicast security key update request to the base station, or receives a multicast security key update response from the base station. The encryption/decryption unit 1130 encrypts a multicast traffic to be transmitted or decrypts a received multicast traffic, using the multicast security key.

Referring to FIG. 12, an apparatus supporting security includes a security key generator 1210, a transceiver 1220, and an encryption/decryption unit 1230. The security support apparatus of FIG. 12 may be included in a base station, or may be the base station itself.

The security key generator 1210 generates or updates a multicast security key to share the multicast security key with a mobile station, as described with reference to FIG. 4 to FIG. 10. The transceiver 1220 receives a multicast security key update request to the mobile station, or transmits a multicast security key update response to the mobile station. The encryption/decryption unit 1230 encrypts a multicast traffic to be transmitted or decrypts a received multicast traffic, using the multicast security key.

While this invention has been described in connection with what is presently considered to be practical embodiments, it is to be understood that the invention is not limited to the disclosed embodiments, but, on the contrary, is intended to cover various modifications and equivalent arrangements included within the spirit and scope of the appended claims.

What is claimed is:

1. A method of supporting a security for a multicast communication in a mobile station, the method comprising:

sharing a multicast authorization key (MAK) with a base station;

deriving a prekey based on a first parameter, the first parameter including the MAK and an identifier of a multicast group to which the mobile station belongs;

deriving a multicast security key including a multicast traffic encryption key (MTEK) based on a second parameter including the prekey;

decrypting a multicast traffic using the multicast security key;

receiving a message including information to update of the multicast security key from the base station; and updating the multicast security key based on the information, wherein the information includes an identifier of a multicast group and a flow identifier within the multicast group where the multicast security key is updated, or a connection identifier of the multicast group where the multicast security key is updated.

2. The method of claim 1, wherein the first parameter further includes an identifier of a multicast group zone to which the base station belongs, and wherein the multicast group zone includes a base station set including at least one base station.

3. The method of claim 1, further comprising:

receiving a message including information of the MTEK to update from the base station before a lifetime of the MTEK expires;

determining whether the MTEK is needed to update by comparing the information to update with current information; and updating the MTEK based on the update information when the information to update is different the current information.

4. The method of claim 3, wherein the mobile station maintains a current MTEK when the information to update is the same as the current information.

5. The method of claim 3, wherein the information to update includes at least one of an encryption key sequence number or a counter value used to derive the MTEK.

6. The method of claim 5, wherein the information to update further includes a lifetime of the MTEK.

7. A method of supporting a security for a multicast communication in a base station, the method comprising:

sharing a multicast authorization key (MAK) with a first mobile station;

deriving a prekey based on a first parameter, the first parameter including the MAK and an identifier of a multicast group to which the first mobile station belongs;

deriving a multicast security key including a multicast traffic encryption key (MTEK) based on a second parameter including the prekey;

encrypting a multicast traffic using the multicast security key; and transmitting a message including update information of the multicast security key to the first mobile station, wherein the update information includes an identifier of a multicast group and a flow identifier within the multicast group where the multicast security key is updated, or a connection identifier of the multicast group where the multicast security key is updated.

8. The method of claim 7, wherein the first parameter further includes an identifier of a multicast group zone to which the base station belongs, and wherein the multicast group zone includes a base station set including at least one base station.

9. The method of claim 7, further comprising transmitting a message including information of the MTEK to the first mobile station before a lifetime of the MTEK expires, wherein the information is compared with current information of the first mobile station to be used to determine whether the MTEK is needed to update.

10. The method of claim 9, wherein the update information includes at least one of an encryption key sequence number or a counter value used to derive the MTEK.

11. The method of claim 10, wherein the update information further includes a lifetime of the MTEK.

12. The method of claim 7, further comprising:
joining a second mobile station in a multicast group to which the first mobile station belongs;
transmitting a message including update information of the multicast security key to the second mobile station; and
transmitting a message including the update information of the multicast security key to other mobile station of the multicast group.

13. The method of claim 7, further comprising:
leaving the first mobile station from the multicast group; and
transmitting a message including the update information of the multicast security key to other mobile station of the multicast group.

14. An apparatus for supporting a security for a multicast communication, the apparatus comprising:
a security key generator configured to share a multicast authorization key (MAK) with a base station, derive a prekey based on a first parameter, the first parameter including the MAK and an identifier of a multicast group to which the first mobile station belongs, and derive a multicast security key including a multicast traffic encryption key (MTEK) based on a second parameter including the prekey;
an encryption/decryption unit configured to decrypt a multicast traffic using the multicast security key; and
a transceiver configured to receive a message including information to update of the multicast security key from the base station,
wherein the security key generator is further configured to update the multicast security key based on the information, and
wherein the information includes an identifier of a multicast group and a flow identifier within the multicast group where the multicast security key is updated, or a connection identifier of the multicast group where the multicast security key is updated.

15. An apparatus for supporting a security for a multicast communication, the apparatus comprising:
a security key generator configured to share a multicast authorization key (MAK) with a mobile station, derive a prekey based on a first parameter, the first parameter including the MAK and an identifier of a multicast group to which the first mobile station belongs, and derive a multicast security key including a multicast traffic encryption key (MTEK) based on a second parameter including the prekey;
an encryption/decryption unit configured to encrypt a multicast traffic using the multicast security key; and
a transceiver configured to transmit a message including update information of the multicast security key to the first mobile station,
wherein the update information includes an identifier of a multicast group and a flow identifier within the multicast group where the multicast security key is updated, or a connection identifier of the multicast group where the multicast security key is updated.

* * * * *